US 8,024,670 B1

(12) United States Patent  (10) Patent No.: US 8,024,670 B1
Rahmatian et al.  (45) Date of Patent: Sep. 20, 2011

(54) WORKFLOW MANAGEMENT USING LIVE THUMBNAILS

(75) Inventors: Keyvan Rahmatian, San Francisco, CA (US); Sharla Kay Fullerton, Brisbane, CA (US); Christopher Edward Smith, Felton, CA (US); Scott Williams, San Anselmo, CA (US)

(73) Assignee: Intuit Inc., Mountain View, CA (US)

( * ) Notice: Subject to any disclaimer, the term of this patent is extended or adjusted under 35 U.S.C. 154(b) by 735 days.

(21) Appl. No.: 11/929,942

(22) Filed: Oct. 30, 2007

(51) Int. Cl.
*G06Q 10/00* (2006.01)
*G06F 3/14* (2006.01)
*G06F 17/60* (2006.01)

(52) U.S. Cl. ........ 715/838; 715/835; 715/837; 715/810; 715/777; 705/7.14; 705/38; 705/320; 705/342; 707/737; 707/802

(58) Field of Classification Search .......... 715/200–277; 700/701–866; 709/201–229; 705/50–79; 345/30–111; 348/206–231.9
See application file for complete search history.

(56) References Cited

U.S. PATENT DOCUMENTS

| 7,673,255 B2 * | 3/2010 | Schechter et al. ............ 715/838 |
| 2004/0267595 A1 * | 12/2004 | Woodings et al. ................. 705/9 |
| 2005/0138576 A1 * | 6/2005 | Baumert et al. .............. 715/862 |
| 2005/0165829 A1 * | 7/2005 | Varasano ....................... 707/102 |
| 2006/0271688 A1 * | 11/2006 | Viger et al. .................... 709/227 |
| 2008/0104535 A1 * | 5/2008 | DeLine et al. ................ 715/785 |
| 2008/0127095 A1 * | 5/2008 | Brennan et al. ............... 717/124 |
| 2008/0134095 A1 * | 6/2008 | Van Wyk et al. .............. 715/838 |
| 2009/0254572 A1 * | 10/2009 | Redlich et al. .................. 707/10 |

* cited by examiner

*Primary Examiner* — Ruay Ho
(74) *Attorney, Agent, or Firm* — Osha • Liang LLP

(57) ABSTRACT

A method for performing a task, which includes generating a user interface with multiple screens where each screen corresponds to a step in a workflow used for performing the task; generating multiple live thumbnails which include miniaturized sections of the screens; displaying a first screen of the multiple screens and the multiple live thumbnails to a user using the user interface; populating a field on the first screen with input data entered by the user; determining a validity of the input data; updating a first live thumbnail of the multiple live thumbnails corresponding to the first screen based on the input data and the validity; receiving a screen selection from the user; displaying a second screen of the multiple screens corresponding to the screen selection; and updating a second live thumbnail of the multiple live thumbnails corresponding to the second screen based on the screen selection.

9 Claims, 4 Drawing Sheets

WORKFLOW MANAGEMENT USING LIVE THUMBNAILS

BACKGROUND

Payroll is a series of accounting transactions centered around making payments to employees. In addition to calculating a basic hourly wage or salary for an employee, an employer must also disburse as gross pay any commission, bonuses, vacation pay, sick leave, or other compensation. On the other hand, the employer is responsible for withholding various debits from the employee's gross pay, including income tax, other taxes (such as social security and Medicare), health insurance, union dues, pension plan contributions, and other deductions.

After the appropriate deductions have been removed from the gross pay, the employee is paid the remaining amount, known as net pay. The net pay is typically disbursed to the employee in the form of cash, a handwritten check, a printed check, as a direct deposit into the employee's bank account, or some other form of electronic transfer. Along with the disbursement of payment, the employee may receive a pay stub detailing the gross income as well as the deductions for the current pay period. The pay stub may also include year to date totals for important items on the paycheck, such as gross pay, income tax withholding, social security withholding, Medicare withholding, deductions, and other details.

In addition to calculating and paying employees' net income, the employer is also responsible for transferring deducted amounts from employee paychecks, as well as making additional monetary contributions, to the appropriate organizational (i.e., governmental) bodies. For example, the employer must send portions of the employee's withholdings and any employer matching contributions to: (1) the Internal Revenue Service (IRS) as tax payments, (2) the insurance plan administrator for the group health care plan to which the employer is enrolled as health insurance payments, (3) any retirement plans, such as 401k plans, offered by the employer (including matching funds) as funding payments, and (4) any other entity for payment of any additional expenses.

Businesses may choose to process payroll by hand, by using accounting software, and/or by hiring a payroll service to handle the payroll needs of the company or small business. Small businesses with very few employees often perform payroll by hand, while small businesses with greater numbers of employees tend to use off-the-shelf payroll software or the assistance of a payroll service. Larger corporations tend to use payroll modules found within Human Resources Management Systems (HRMS), which may be client/server based software systems for streamlining and automating many aspects of human resources (HR) management.

Because of the complexities associated with payroll, payroll software often uses wizards to help employers process payroll. A wizard refers to a user interface that leads a user through a sequence of dialogs to perform a task, such as processing payroll and/or taxes. The dialogs may be used to display information, such as tax laws and regulations, to the user and/or obtain information, such as payroll and employee information, from the user. By walking the user through a series of steps required to perform the task, the wizard may help the user complete complex and/or infrequently performed tasks. However, because wizards require sequential completion of the steps, the user may be forced to perform the steps associated with the task in a specific sequence. In addition, the user may be required to scroll through multiple dialogs to update information and/or preferences associated with one dialog.

SUMMARY

In general, in one aspect, the invention relates to a method for managing a workflow. The method includes generating a user interface comprising a plurality of screens associated with the workflow and a plurality of live thumbnails corresponding to the plurality of screens; displaying a first of the plurality of screens and the plurality of live thumbnails to a user using the user interface; receiving input data entered by the user using the first of the plurality of screens; determining a validity of the input data; and updating a first of the plurality of live thumbnails corresponding to the first of the plurality of screens based on the input data and the validity, where the input data is used to perform a task for the user within the workflow.

In general, in one aspect, the invention relates to a method for processing payroll. The method includes generating a payroll wizard, wherein the payroll wizard comprises a plurality of screens and a plurality of live thumbnails corresponding to the plurality of screens; displaying a first of the plurality of screens and the plurality of live thumbnails to a user using the payroll wizard; receiving payroll data from the user using the first of the plurality of screens; determining a validity of the payroll data; and updating a first of the plurality of live thumbnails corresponding to the first of the plurality of screens based on the payroll data and the validity, where the payroll data is used to process payroll for the user.

In general, in one aspect, the invention relates to a graphical user interface (GUI) for managing a workflow. The GUI includes a plurality of screens configured to obtain data from a user; and a plurality of live thumbnails corresponding to the plurality of screens, where at least one of the plurality of live thumbnails is updated based on a validity of the data and the data, and where the data is used to perform a task for the user within the workflow.

In general, in one aspect, the invention relates to a payroll system. The payroll system includes an employer data repository configured to store employer data corresponding to an employer; an employer interface configured to obtain the employer data, including: a first plurality of screens; and a first plurality of live thumbnails corresponding to the first plurality of screens; a rules repository configured to store a plurality of payroll rules; and a rules repository configured to determine a validity of the employer data based on the plurality of payroll rules, where a payroll and taxes of the employer are processed using the employer interface, and where at least one of the first plurality of live thumbnails is updated based on the employer data and the validity of the employer data.

Other aspects of the invention will be apparent from the following description and the appended claims.

DETAILED DESCRIPTION

Figure 1:
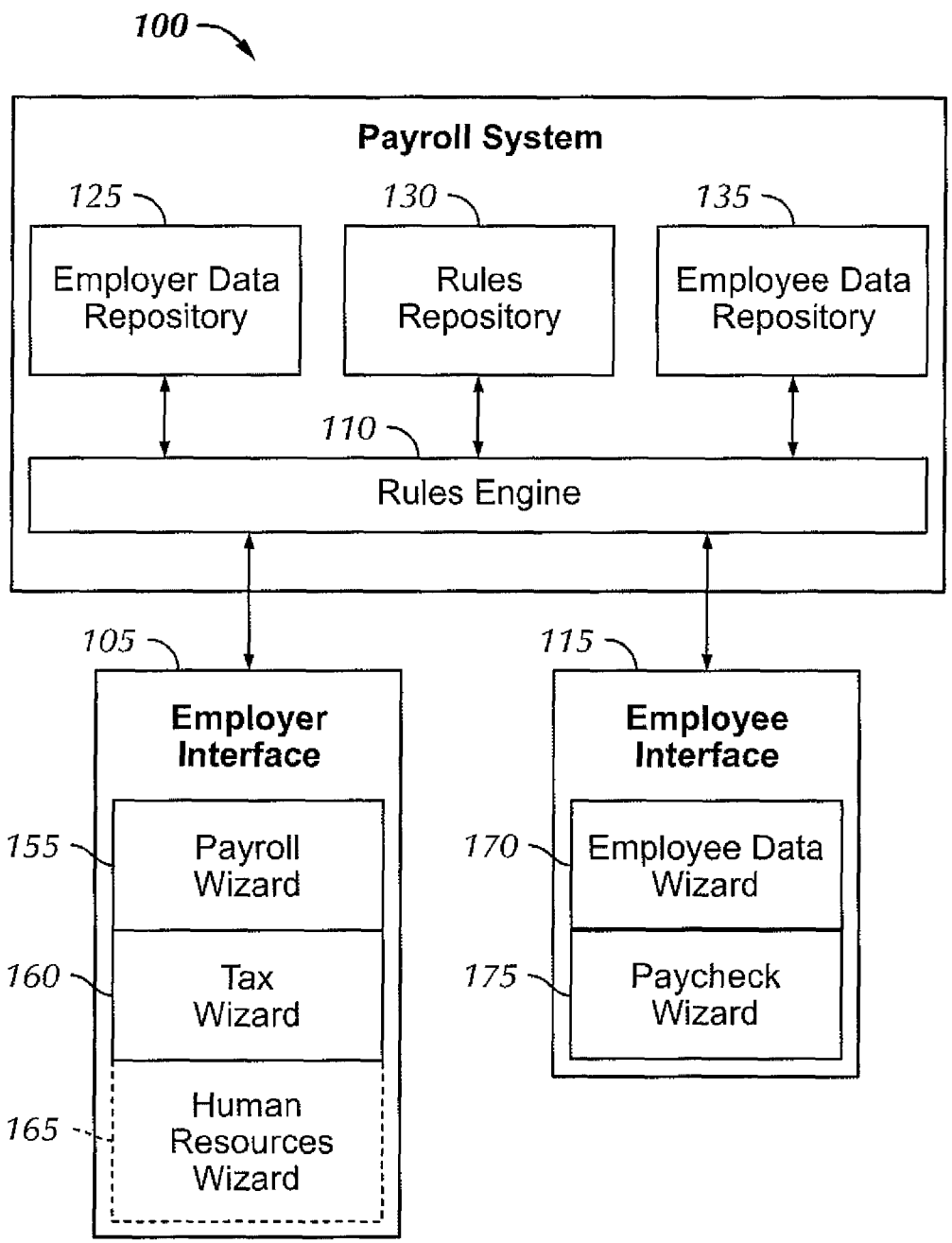
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus to manage workflow. Specifically, embodiments of the invention provide a method and apparatus to manage workflow using live thumbnails in a user interface. The workflow may be associated with sequential screens in the user interface that obtain input data from a user. In addition, the sequential screens may be displayed individually (i.e., one at a time). Each screen may be associated with a live thumbnail, which is updated in real time as the data is entered by the user. The live thumbnail may summarize the data entered by the user, as well as indicate the data's validity and/or completeness. Further, the user may access the screens non-sequentially by clicking on a live thumbnail to jump to the screen corresponding to the live thumbnail. Embodiments of the invention may be used in a wizard, such as a payroll wizard. Further, embodiments of the invention may assist users in performing complex and/or lengthy tasks and allow users to choose the order of steps performed in the workflow.

FIG. 1 shows a schematic diagram of a system in accordance with one or more embodiments of the invention. As shown in FIG. 1, the system includes a payroll system (100), an employer interface (105), and an employee interface (115). Each of these components is described below.

The payroll system (100) provides payroll and accounting services to users through various interfaces (e.g., the employer interface (105), employee interface (115), etc). As specified by the interface names, the employer interface (105) is mainly used by employers, and the employee interface (115) is accessed by employees. The interfaces allow the user of the payroll and/or accounting services to interact with various components of the payroll system (100) using a user-friendly environment (e.g., a graphical user interface). Further, because of the sensitive nature of payroll information, these interfaces are often secure connections employing various known techniques for keeping sensitive information secure.

In one or more embodiments of the invention, the payroll system (100) is implemented using a client-server architecture. The payroll system (100) itself may be an enterprise application running on one or more servers, and in some embodiments could be a peer to peer system, or resident upon a single computing system. In addition, the payroll system (100) is accessible from other machines using the employer interface (105) and/or employee interface (115). In one or more embodiments of the invention, the employer interface (105) and employee interface (115) are web pages that can be reached from a computer with a web browser and internet connection. Alternatively, the employer interface (105) and employee interface (115) are applications that reside on computing systems, which may include personal computers (PCs), mobile devices, personal digital assistants (PDAs), and other digital computing devices of the respective users, and that communicate with the payroll system (100) through one or more network connections and protocols. Regardless of the architecture of the system, communications between the payroll system (100) and the interfaces may be secure, as described above.

The payroll system (100) also includes an employer data repository (125), employee data repository (135), rules repository (130), and rules engine (110). The employer data repository (125) includes data about employers in the payroll system (100). For example, for each employer in the payroll system (100), the employer data repository (125) may include an entry with information such as business name, employer identification number (EIN), number of employees, a list of employees and their wages, the corporate income tax rate of the business, deductions, and/or other information relevant to the business and its accounting and payroll practices. By accessing the employer interface (105), an employer is able to enroll in the payroll system (100) and add, update, or delete information in the employer data repository (125). For example, an employer may choose to add a new employee, remove an employee's records after he/she has left the company, or update the number of employees in the company after personnel changes.

Similarly, the employee data repository (135) stores information about employees in the payroll system (100). Entries in the employee data repository (135) may correspond to individual employees. Further, each entry may contain information about the employee, such as last name, first name, address, age, social security number, annual income, tax filing status, tax bracket, employer, and/or other information related to the employee and the employee's employment. In one or more embodiments of the invention, an entry in the employee data repository is created for a new employee of a company using the payroll system (100). The employee may then use the employee interface (115) to update his/her information (e.g., change in address, marital status, income, or other personal information) and preferences in the payroll system (100). In one or more embodiments of the invention, the employee data repository (135) is linked to the employer data repository (125). Changes to either repository are correspondingly updated in the other repository.

For example, if an employee has left a company, the employer may delete the employee from the employee roster stored in the company's entry in the employer data repository (125). The payroll system (100) then automatically updates the employee's entry in the employee data repository (135) to reflect the employee's change in employment at the company. Alternatively, the employee may first update his employment status through the employee interface (115). The change is then transferred over to the employer data repository (125) from the employee data repository (135).

In one or more embodiments of the invention, restrictions may be put in place against updating certain fields of information by certain parties. For example, an employee may not be able to change his/her employer in his employee data repository (135) entry without the consent of the old and/or new employer. At the same time, if an employee has changed jobs from one company in the payroll system (100) to another company in the payroll system (100), the employee's information may be automatically entered in the new company's employer data repository (125) by porting the information from the previous company's entry in the employer data repository (125) and/or the employee's entry in the employee data repository (135). Such portability of employee benefit information provides the employee and employer with the convenience of leveraging existing data to populate the data repository and avoid time-consuming paperwork.

The rules repository (130) contains rules associated with the payroll system (100). Specifically, the rules repository (130) may include rules governing the processing of payroll. For example, the rules repository (130) may include rules that specify the data used to perform payroll, various transactions associated with payroll, tax rules, withholding rules, human resources regulations, and/or other rules related to the management of employees. The rules may also dictate the transfer of information between the employer data repository (125) and the employee data repository (135). The rules may be obtained from a variety of sources (e.g., government agencies, experts, employers, employees, developers, accountants, etc.) and stored in the rules repository (130) by an administrator. On the other hand, the payroll system (100) may include interfaces (not shown) with one or more agencies, benefit providers, and/or other sources of payroll and/or repository related rules.

The interfaces may allow the payroll system (100) to obtain up-to-date rules regarding payroll-related transactions and store the rules in the rules repository (130). Those skilled in the art will appreciate that rules may be stored in various forms in the rules repository (130). For example, the rules may include data structures corresponding to data provided by an employer and/or employee, inference rules governing the processing of the data, logic tables, and/or other mechanisms for specifying payroll-related rules.

In one or more embodiments of the invention, the rules engine (110) is responsible for enforcing the rules in the rules repository (130). For example, the rules engine (110) may use the rules to determine the validity of data entered by an employer and/or employee, determine the completeness of the data entered, perform calculations related to payroll transactions, and/or provide feedback to the employer and/or employee. In other words, payroll services for employers and/or employees associated with the payroll system (100) are carried out by the rules engine (110). The rules engine (110) is described in further detail below.

In one or more embodiments of the invention, the employer data repository (125), rules repository (130), and employee data repository (135) are stored in one or more databases, which may be flat, hierarchical, network based, relational, dimensional, object modeled, or another database model. For example, each repository (e.g., employer data repository (125), rules repository (130), employee data repository (135)) may be maintained in a table of a SQL database. In addition, entries in each repository (e.g., employer data repository (125), rules repository (130), employee data repository (135)) are linked to entries in other repositories. For example, each entry in each repository (e.g., employer data repository (125), rules repository (130), employee data repository (135)) may be associated with a primary key or unique ID.

An employer's entry in the employer data repository (125) may be identified with a unique employer ID, an employee's entry in the employee data repository (135) may be identified using a unique employee ID, and a rule's entry in the rules repository (130) may be distinguished from others with a unique rule ID. An employer's entry in the employer data repository (125) may also contain a list of employees and information about each employee. Instead of storing all of the information within the employer's entry in the employer data repository (125), the employer's entry may simply contain a list of employee IDs from the employee data repository (135). The payroll system (100) is then able to retrieve information about an employee for an employer by running a query for an employee's entry using the employee's unique ID, receiving a response from the database containing the employee's information, and transferring the data back to the employer. As an example, a query in a SQL database may use the keywords "join" or "union" to search the employee table using employee IDs from the employer table and return results corresponding to the employee IDs.

Likewise, an employee's entry in the employee data repository (135) may include a field for the employee's place of employment. Instead of storing all of the information about the employee's company within the employee's entry, the employee's entry may simply contain the employer ID of his company of employment. Any information needed by the employee about the company is provided by performing a database query of the employer data repository (125) using the company's employer ID and relaying the result to the employee.

In addition, changes in one entry in a repository (e.g., employer data repository (125), rules repository (130), employee data repository (135)) are easily synchronized with entries in the other repositories. For example, if an employee changes companies, the company ID of the employee's entry in the employee data repository (135) is changed from the old company's ID to the new company's ID. Each company's entry in the employer data repository (130) is correspondingly updated; the employee's ID would be removed from the old company's list of employees, and the employee's ID would be added to the new company's employee roster. Changes to the rules repository (130) may be reflected in the data and/or data formats stored in the employer data repository (125) and/or employee data repository (135).

For example, if the rules in the rules repository (130) are updated to reflect new income tax brackets, the tax withholding amounts for employers in the employer data repository (125) and employees in the employee data repository (135) may be updated according to the rules. Alternatively, fields for tax withholding amounts in the employer data repository (125) and/or employee data repository (135) may simply reference the rules (e.g., using the rule IDs) that specify tax withholding amounts. As a result, changes to tax brackets may be reflected in tax withholdings by using the updated rules to calculate the tax withholdings rather than changing one or more entries in the employer data repository (125) and/or employee data repository (135). As stated above, rules in the rules repository (130) may be enforced by the rules engine (110). To carry out changes in the rules within the payroll system, the rules engine (110) may notify the employers and/or employees of the changes, obtain additional data from the employers and/or employees, and/or reformat data stored in the employer data repository (125) and/or employee data repository (135).

While the invention has been described with separate data repositories (i.e., one for the employer, one for the rule, and one for the employee), one skilled in the art will appreciate that a single data repository may be used to hold all data associated with the payroll system. Likewise, while the data repositories might each be separate, a single database may hold all data repositories or various combinations thereof. Further, the data repository may take the form of any acceptable data storage mechanism to store and retrieve payroll data. Even further, a data repository used with a payroll system (100) often includes data protection and security schemes to protect sensitive data from corruption, theft, attack, destruction, and other forms of intrusion and loss of integrity.

As mentioned above, the rules engine (110) is responsible for implementing and enforcing the rules in the rules repository (130). The rules engine (110) may form a part of the relational database containing the repositories (e.g., employer data repository (125), rules repository (130), employee data repository (135)), or the rules engine (110) may be a standalone application or a separate part of the payroll system (100). The rules engine (110) may be implemented as an inference engine of an expert system that serves as a backend for one or more wizards (e.g., payroll wizard (155), tax wizard (160), human resources wizard (165), employee data wizard (170), paycheck wizard (175)) provided by the payroll system (100). Further, the wizards (e.g., payroll wizard (155), tax wizard (160), human resources wizard (165), employee data wizard (170), paycheck wizard (175)) may be displayed to users of the payroll system (100) using the employer interface (105) and/or employee interface (115).

As shown in FIG. 1, the employer interface (105) includes an payroll wizard (155), a tax wizard (160), and an optional human resources wizard (165). The payroll wizard (155) allows an employer to manage the payroll of his/her employees. In one or more embodiments of the invention, the payroll wizard (155) performs the necessary steps to calculate an employee's gross to net pay and issues paychecks to employees. An employer may specify each employee's salary and/or hourly wage, hours worked by the employee, any commission or overtime earned by the employee, the pay period of each paycheck, and other parameters related to the employee's position. Based on that information, the payroll wizard (155) calculates the necessary paycheck information needed for each employee based on the employee's net pay, any additional payments to the employee such as bonuses, overtime, and reimbursement for expenses, and deductions such as federal income tax, state income tax, social security, and Medicare tax.

The tax wizard (160) performs the necessary steps to allow an employer to calculate taxes owed by the company. For example, the company may need to send tax withholdings from employees' income, as well as contributions of its own such as social security matching contributions and tax on revenue, to the Internal Revenue Service (IRS). In one or more embodiments of the invention, the tax wizard (160) has functionality to provide tax forms to an employer for calculating taxes owed to the government. Additionally, the tax wizard (160) may have functionality to provide information about the employer's tax rates based on data supplied by the employer and help the employer calculate any taxes owed to the government. The tax wizard (160) may also provide electronic filing services to the employer, as well as electronic payment of taxes.

The human resources wizard (165) has functionality to provide human resources-related services to the employer. The human resources wizard (165) may provide features that allow an employer to manage the salaries, bonuses, roles, promotions, and other job-related aspects of his employees and keep track of possible candidates for employment. For example, the human resources wizard (165) may allow an employer to enter performance reviews for employees, keep track of hours logged for each employee, report new hires, maintain a list of resumes for prospective employees, handle employee benefit enrollment functions, provide functionality to intake new employees, and perform other human resources related functions. The human resources wizard (165) may also include a directory of employees the employer can browse or search. The directory may list each employee's contact information, shifts the employee is assigned to, a picture of the employee, and other information about the employee.

In one or more embodiments of the invention, the employee interface (115) includes an employee data wizard (170) and a paycheck wizard (175). The employee interface (115) allows an employee to enter data into the payroll system (100) and manage his/her paychecks. In one or more embodiments of the invention, a new employee of an employer in the payroll system (100) is directed to the employee data wizard (170) for filling out new hire forms, such as I-9 or W-4 forms, registering in the payroll system (100), and/or completing other new hire functions.

In one or more embodiments of the invention, the data entered by the employee may be stored in the employee data repository (135) and used by the employer to manage the employee, process payroll for the employee, and/or process taxes for the employer, as described above. The data may also be updated by the employee using the employee data wizard (170) as the employee's personal and/or employment-related circumstances change.

In one or more embodiments of the invention, the paycheck wizard (175) includes functionality to allow the employee to manage his/her paychecks. The paycheck wizard (175) may allow the employee to specify a method of receiving pay (e.g., direct deposit, paper check, etc.). The paycheck wizard (175) may also allow the employee to specify withholdings, such as tax withholdings, benefit withholdings, and/or flexible spending account withholdings, from his/her paycheck. The paycheck wizard (175) may also include accounting software for managing paychecks and budgets.

Those skilled in the art will appreciate that each of the wizards (e.g., payroll wizard (155), tax wizard (160), human resources wizard (165), employee data wizard (170), paycheck wizard (175)) may be associated with a series of screens (i.e., dialogs, windows, etc.) to facilitate the execution of tasks (e.g., processing payroll, preparing taxes, managing paychecks, managing employees, etc.) by employers and/or employees in the payroll system (100). In one or more embodiments of the invention, the screens are ordered sequentially to guide the employers and/or employees through one or more workflows associated with the tasks. The screens may include a series of radio buttons, checkboxes, text boxes, drop-down boxes, file search and/or upload utilities, and/or other elements for obtaining data and/or preferences from the employers and/or employees. For example, one screen may ask for personal information related to an employee, such as the employee's name, address, age, marital status, and/or gender. The next screen may ask for wage information related to the employee. The wizard (e.g., payroll wizard (155), tax wizard (160), human resources wizard (165), employee data wizard (170), paycheck wizard (175)) may then determine the employee's eligibility for certain benefits based on the employee's personal information and wage information.

As a result, an employer and/or employee associated with the payroll system (100) may complete one or more payroll-related tasks using the workflows provided by one or more wizards (e.g., payroll wizard (155), tax wizard (160), human resources wizard (165), employee data wizard (170), paycheck wizard (175)). In other words, the employer and/or employee may perform a payroll-related task by accessing the screens of one or more wizards (e.g., payroll wizard (155), tax wizard (160), human resources wizard (165), employee data wizard (170), paycheck wizard (175)) in order and providing data and/or preferences as prompted by the screens. The employer and/or employee may also review the data before submitting the data to the payroll system (100) and allowing the payroll system (100) to perform the task using the data. In one or more embodiments of the invention, the breakdown of complex tasks into a series of steps by the wizards (e.g., payroll wizard (155), tax wizard (160), human resources wizard (165), employee data wizard (170), paycheck wizard (175)) allows the employer and/or employee to perform the tasks with greater ease and efficiency.

On the other hand, the employer and/or employee may proceed through the workflows associated with the wizards (e.g., payroll wizard (155), tax wizard (160), human resources wizard (165), employee data wizard (170), paycheck wizard (175)) non-sequentially. In other words, the employer and/or employee may access the screens out of order.

In one or more embodiments of the invention, live thumbnails may be used by the employer and/or employee to access the screens of a wizard (e.g., payroll wizard (155), tax wizard (160), human resources wizard (165), employee data wizard (170), paycheck wizard (175)) in an arbitrary fashion, as explained below. For example, an employer may view the first screen of a wizard (e.g., payroll wizard (155), tax wizard (160), human resources wizard (165), employee data wizard (170), paycheck wizard (175)) without entering data requested by the first screen, then go directly to the last screen in the wizard without scrolling through any screens in between.

In one or more embodiments of the invention, the live thumbnails are used by the wizards (e.g., payroll wizard (155), tax wizard (160), human resources wizard (165), employee data wizard (170), paycheck wizard (175)) to further assist the employers and/or employees with managing the workflows associated with the wizards. In one or more embodiments of the invention, each screen of a wizard (e.g., payroll wizard (155), tax wizard (160), human resources wizard (165), employee data wizard (170), paycheck wizard (175)) is associated with a live thumbnail. The live thumbnail is updated in real time as the employer and/or employee enters data into the screen. Specifically, the live thumbnail may indicate a summary of the data, a completeness of the data, a validity of the data, and/or other elements related to the screen and/or the data. In one or more embodiments of the invention, the live thumbnails correspond to miniaturized screenshots of the data entered by the employer and/or employee on each screen. As a result, the live thumbnails may assist the employers and/or employees with entering data, fixing errors, reviewing the data, and/or managing the workflow related to a wizard (e.g., payroll wizard (155), tax wizard (160), human resources wizard (165), employee data wizard (170), paycheck wizard (175)). In other words, the live thumbnails may further assist the employers and/or employees with performing complex and/or lengthy tasks associated with the payroll system (100).

As mentioned above, only one screen in a wizard (e.g., payroll wizard (155), tax wizard (160), human resources wizard (165), employee data wizard (170), paycheck wizard (175)) is displayed at a time. However, in one or more embodiments of the invention, all live thumbnails associated with the wizard (e.g., payroll wizard (155), tax wizard (160), human resources wizard (165), employee data wizard (170), paycheck wizard (175)) are displayed for the duration of an employer's and/or employee's access to the wizard. In other words, if the paycheck wizard (175) includes five screens, only one screen may be displayed within the paycheck wizard (175) at a time but all five live thumbnails corresponding to the five screens are displayed at all times within the paycheck wizard (175). The live thumbnails may be arranged around the current screen, on the side of the current screen, on top of the current screen, at the bottom of the current screen, and/or in other ways as long as the current screen is unobstructed.

The live thumbnails may further include functionality to allow the employer and/or employee to access the screens of a wizard (e.g., payroll wizard (155), tax wizard (160), human resources wizard (165), employee data wizard (170), paycheck wizard (175)) in non-sequential order, as mentioned above. To do so, the employer and/or employee may click on a live thumbnail corresponding to a screen to go directly to the screen. For example, if the employer and/or employee is currently viewing the $10^{th}$ screen out of 50 screens, he/she may access the $40^{th}$ screen by clicking on the live thumbnail corresponding to the $40^{th}$ screen without scrolling through the screens in between. As a result, the employer and/or employee may enter data into the wizard (e.g., payroll wizard (155), tax wizard (160), human resources wizard (165), employee data wizard (170), paycheck wizard (175)) in an order preferred by the employer and/or employee, rather than the order specified by the sequence of screens.

As mentioned above, the live thumbnails may correspond to miniaturized screenshots of each screen of a wizard (e.g., payroll wizard (155), tax wizard (160), human resources wizard (165), employee data wizard (170), paycheck wizard (175)) that may be updated in real time as the employer and/or employee enters data into the screens of the wizard (e.g., payroll wizard (155), tax wizard (160), human resources wizard (165), employee data wizard (170), paycheck wizard (175)). In one or more embodiments of the invention, the data obtained from the employer and/or employee is processed by the rules engine (110) to locate errors, missing information, and/or other items of interest to the employer and/or employee. The live thumbnail(s) corresponding to the data may then be updated in real time to reflect the processing of the data by the rules engine (110), as well as display the data entered. Consequently, the real time update of the live thumbnails may allow the employer and/or employee to better ascertain the steps of the workflow, supply missing data, and/or tailor the steps of the workflow to his/her own personal preferences.

In one or more embodiments of the invention, updates to the live thumbnails may include text, highlighting, bordering, coloring, font formatting, and/or symbols (e.g., checkmarks). For example, the thumbnail corresponding to the current screen may be highlighted and/or bordered. In addition, a screen with complete and/or valid data may be colored green, whereas a screen with incomplete and/or invalid data may be colored red. Errors in the data may be denoted with red and/or bold font, whereas valid data may be denoted using normal black font. Those skilled in the art will appreciate that other methods, symbols, and/or formatting changes may be used to indicate various states of the wizards (e.g., payroll wizard (155), tax wizard (160), human resources wizard (165), employee data wizard (170), paycheck wizard (175)) using the live thumbnails.

In one or more embodiments of the invention, the live thumbnails are additionally associated with rollover functionality. In other words, the employer and/or employee may obtain additional information by initiating a rollover of the thumbnail using a cursor. The rollover of the live thumbnail may trigger a pop-up that includes additional information about the live thumbnail and/or the screen corresponding to the thumbnail. For example, the pop-up may include a screen summary, historical information, and error information. The screen summary may describe the workflow steps associated with the screen in greater detail than the live thumbnail. Historical information may include modifications to the data associated with the screen by the employer and/or employee. Error information may include errors in the data found by the rules engine (110), as well as suggestions for correcting the errors. The pop-up may also include information specific to the payroll system (100), such as payroll information, tax information, and/or human resources information.

In one or more embodiments of the invention, each wizard (e.g., payroll wizard (155), tax wizard (160), human resources wizard (165), employee data wizard (170), paycheck wizard (175)) is further associated with a summary thumbnail. In one or more embodiments of the invention, the summary thumbnail is updated when the rules engine (110) determines that the data obtained from the workflow is complete and valid. In other words, the summary thumbnail may be updated with the data entered by the employer and/or employee into the wizard (e.g., payroll wizard (155), tax wizard (160), human resources wizard (165), employee data wizard (170), paycheck wizard (175)). The summary thumbnail may allow the employer and/or employee to review the data before the data is used by the rules engine (110) to perform one or more payroll-related tasks for the employer and/or employee. The summary thumbnail may also be associated with a summary screen that displays the data in greater detail.

Figure 2:
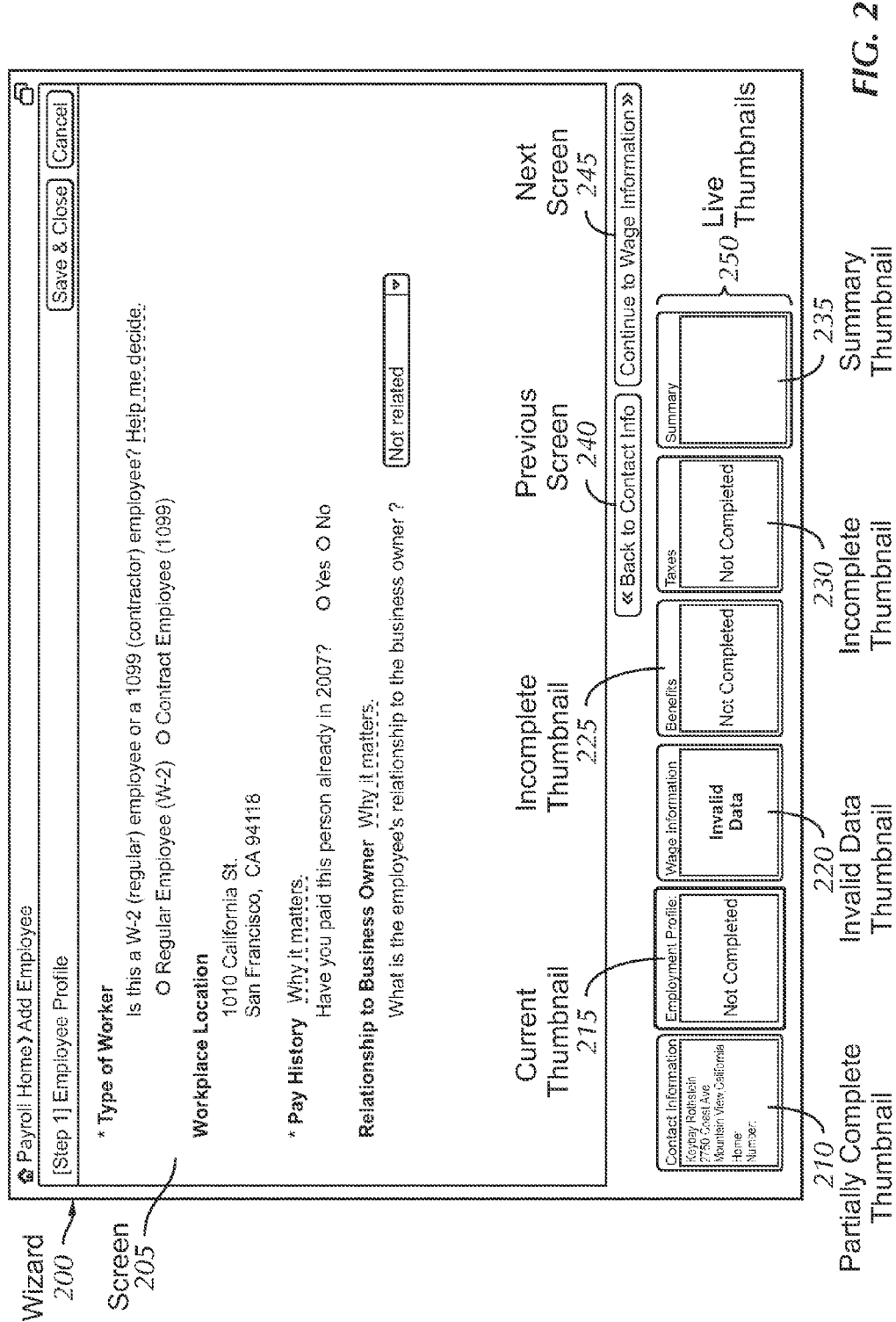
FIG. 2 shows an example screenshot in accordance with one or more embodiments of the invention.

FIG. 2 shows an example screenshot of a graphical user interface (GUI) in accordance with one or more embodiments of the invention. In one or more embodiments of the invention, the GUI of FIG. 2 is used to manage workflow for a user. The GUI of FIG. 2 includes a wizard (200), a screen (205), a previous screen button (240), a next screen button (245), and multiple live thumbnails (250).

The wizard (200) may be used to help the user perform a complex and/or lengthy task, such as processing payroll, by breaking the task down into a series of steps and guiding the user through the series of steps. Those skilled in the art will appreciate that in a general sense, the wizard (200) may be used to help the user perform other tasks, such as filing taxes, setting up a virtual private network (VPN), purchasing insurance, and/or applying for a position. The user completes one or more steps by accessing a screen (205) and entering data requested by the screen (205). The screen (205) includes a series of elements for obtaining data from the user, including radio buttons and drop down boxes. As mentioned above, other elements, such as text boxes, checkboxes, file search utilities, and/or file upload utilities may be used as well.

As mentioned above, the wizard (200) may include multiple screens that may be accessed sequentially. As a result, the wizard (200) also includes buttons for accessing a previous screen (240) and a next screen (245) in the wizard (200). In addition, the wizard (200) includes a series of live thumbnails (250) corresponding to the screens of the wizard. As mentioned above, as the user enters data into the current screen (205), the corresponding live thumbnail (e.g., current thumbnail (215)) is updated in real time to include the data. In other words, the user does not have to manually submit the data to trigger updates to the live thumbnails (250). The user may also go directly to another screen by clicking on the live thumbnail corresponding to the other screen.

The live thumbnails (250) may include additional mechanisms to indicate the validity and/or completeness of the data, as well as provide additional information to the user. For example, the partially complete thumbnail (210) corresponds to the previous screen and includes a summary (e.g., "Keyvan Rahmatian, 2750 Coast Ave., Mountain View, Calif.") of the data entered in the previous screen. The partially complete thumbnail (210) also includes missing fields for "home" and "mobile" phone numbers. The user may supply the missing fields by clicking on the partially complete thumbnail (210) and/or the previous screen button (240) to return to the previous screen and enter the data corresponding to the missing fields into the previous screen. Alternatively, the user may perform a cursor rollover of the partially complete thumbnail (210) and enter the data into a pop-up associated with the partially complete thumbnail (210) if such functionality is provided by the pop-up. Similarly, the user may enter data associated with other screens by performing rollovers of the corresponding live thumbnails (250) and entering the data into the pop-ups generated by the rollovers. As described above, the pop-ups may also include a detailed screen summary, historical information, error information, and/or other information related to the task performed by the wizard (200).

As mentioned above, the current thumbnail (215) corresponds to the current screen (205). Because no data is entered into the current screen (205), the current thumbnail (215) is labeled "not completed." In addition, the current thumbnail (215) includes a border to indicate the user's current selection of the screen (205). As mentioned above, other changes, such as changes to font, formatting, coloring, highlighting, and use of symbols may be used to differentiate the current thumbnail (215) from other live thumbnails (250).

The invalid data thumbnail (220) may indicate that invalid data is entered into the screen associated with the invalid data thumbnail (220). Invalid data may include data that is not within a certain range of values, data that is formatted incorrectly, and/or data that contradicts data entered elsewhere into the wizard (200). For example, invalid payroll data may include negative salary amounts, non-numeric ages, and/or the claiming of a benefit offered to a citizen of a country when the user is a non-citizen. As shown in FIG. 2, the invalid data thumbnail (220) is labeled "invalid data." However, as with the current thumbnail (215), other means may be used to denote the invalid data thumbnail (220). For example, the invalid data may be displayed in red font, bold font, and/or highlighted. The background of the thumbnail may also be highlighted and/or colored. As with the partially complete thumbnail (210), the user may fix the invalid data by performing a rollover of the invalid data thumbnail (220) and changing the data in a pop-up corresponding to the invalid data thumbnail (220), or by clicking on the invalid data thumbnail (220) to access the corresponding screen and edit the data entered into the screen.

The wizard (200) also includes two incomplete thumbnails (e.g., incomplete thumbnail (225), incomplete thumbnail (230)) corresponding to two screens of the wizard (200). The incomplete thumbnails (e.g., incomplete thumbnail (225), incomplete thumbnail (230)) may indicate that no data has been entered into the corresponding screens. Like the current thumbnail (215), the incomplete thumbnails (e.g., incomplete thumbnail (225), incomplete thumbnail (230)) are labeled "not completed" to indicate that no data corresponding to the incomplete thumbnails is available. However, unlike the current thumbnail (215), the incomplete thumbnails (e.g., incomplete thumbnail (225), incomplete thumbnail (230)) are not highlighted with a border because the incomplete thumbnails do not correspond to the currently displayed screen (205).

The summary thumbnail (235) may correspond to a summary screen of the wizard (200). In other words, the summary thumbnail (235) may allow the user to review the data entered into the wizard (200) after the user has completed the steps associated with the other screens in the wizard (200). In one or more embodiments of the invention, the summary thumbnail (235) is not updated until the data entered into the wizard (200) is complete and valid. As a result, the summary thumbnail (235) is blank in the example screenshot of FIG. 2 because not all data requested by the wizard (200) has been provided by the user.

Figure 3:
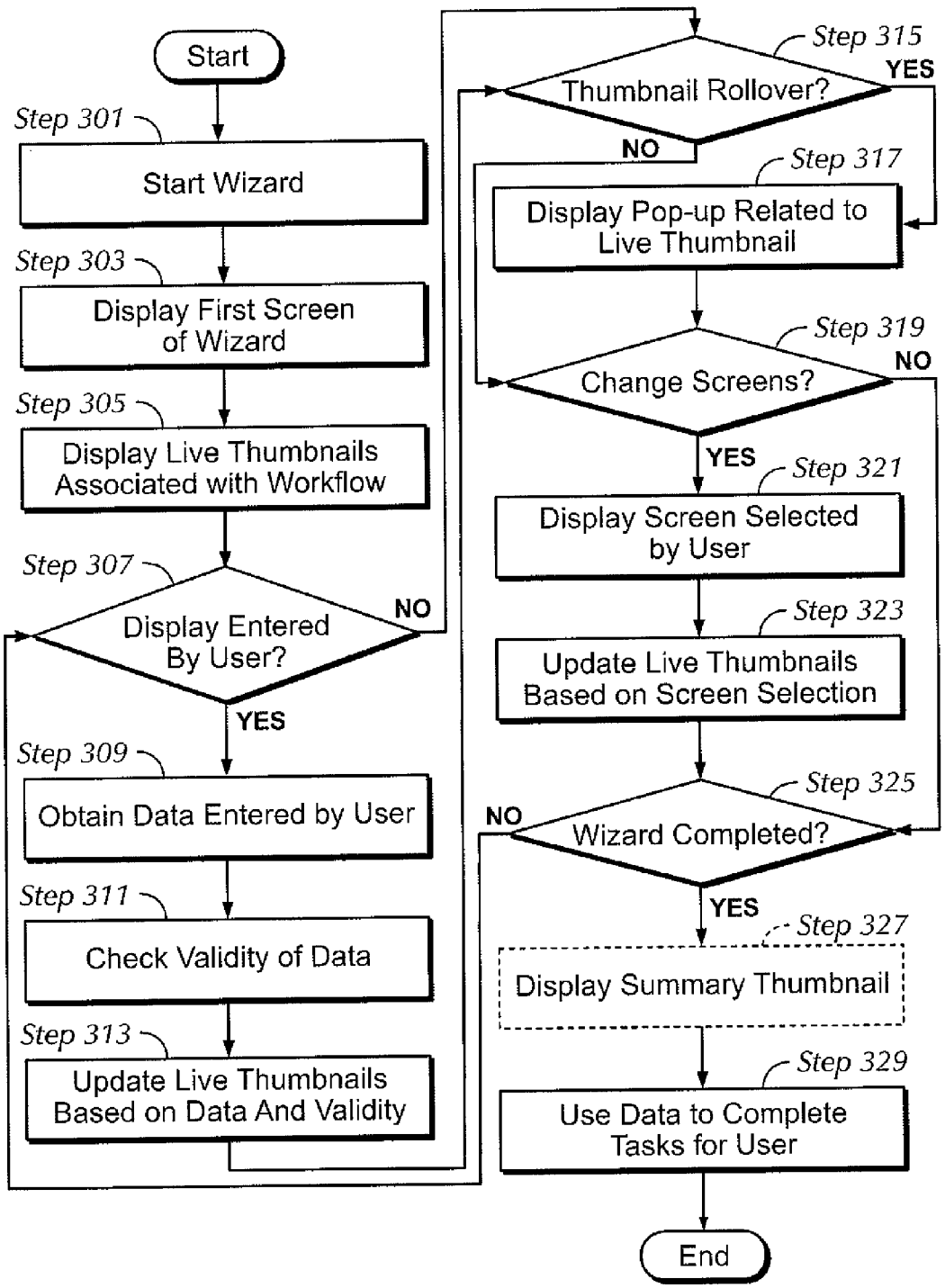
FIG. 3 shows a flow diagram in accordance with one or more embodiments of the invention.

FIG. 3 shows a flow diagram of workflow management in accordance with one or more embodiments of the invention. In one or more embodiments of the invention, one or more of the steps described below may be omitted, repeated, and/or performed in a different order. Accordingly, the specific arrangement of steps shown in FIG. 3 should not be construed as limiting the scope of the invention.

Initially, a wizard is started (Step 301). As mentioned above, the wizard may assist a user with performing a complex and/or lengthy task. In addition, the wizard may be associated with a series of sequential screens in carrying out a workflow associated with the task. As a result, the first screen of the wizard is displayed (Step 303) upon activation of the wizard. In addition, live thumbnails associated with the screens of the wizard are displayed (Step 305) with the first screen. In one or more embodiments of the invention, the live thumbnails are constantly displayed in the wizard, while only one screen is displayed at a time in the wizard.

To perform the task, the user may enter data into the wizard (Step 307). The data may be used by the wizard to perform the task for the user. Additionally, the data may be entered by the user using one or more elements within the screen, such as checkboxes, radio buttons, file search and/or upload utilities, and/or text boxes. As mentioned above, the data may be obtained in real time (Step 309) and checked for validity (Step 311). The validity of the data may be determined using a set of rules and a rules engine, as described above with respect to FIG. 1. In addition, the validity of the data may correspond to ranges of values, data formats, and/or consistency of data entered into the wizard.

The live thumbnails may then be updated based on the data and the validity of the data (Step 313). As mentioned above, the live thumbnails may indicate a variety of states corresponding to the data and the screens in the wizard, such as states for a current thumbnail, incomplete thumbnails, partially complete thumbnails, complete thumbnails, invalid data, valid data, and/or summaries of the data. Similarly, the live thumbnails may be updated in a variety of ways to indicate the states described above to the user. For example, the live thumbnails may include changes to text, font formatting, bordering, coloring, highlighting, and/or symbols.

The user may also perform a thumbnail rollover (Step 315). The thumbnail rollover may correspond to the user's placement of a cursor on top of a live thumbnail for a predefined period of time. If the user performs a thumbnail rollover, a pop-up related to the live thumbnail may be displayed to the user (Step 317). The pop-up may allow the user to edit the data associated with the screen corresponding to the live thumbnail. The pop-up may also display a screen summary of the data requested by the wizard and/or entered by the user, historical information regarding changes to the data, error information related to errors found in the data, and/or information related to the task performed by the wizard.

In addition, the user may change screens (Step 319) to progress through the wizard. As described above, the user may change screens sequentially by clicking on buttons to scroll through previous and/or next screens in the wizard. The user may also change screens non-sequentially by clicking on a live thumbnail associated with a screen the user wishes to access. Since the live thumbnails are displayed throughout the user's access to the wizard, the user may access any screen at any time in the wizard regardless of the current screen displayed and/or the data entered by the user. If the user makes a screen selection using either a live thumbnail or a button for a previous or next screen, the selected screen is displayed to the user (Step 321) and the live thumbnails are updated based on the screen selection (Step 323). As mentioned previously, the live thumbnails may be updated to indicate a new current thumbnail corresponding to the selected screen. The current thumbnail may include highlighting, coloring, font formatting, and/or other changes to indicate the selection of the screen corresponding to the current thumbnail.

The user may enter data (Step 307), use thumbnail rollovers (Step 315), and change screens (Step 319) to progress through the wizard. In addition, the user may use updates in the thumbnails to manage the workflow associated with the wizard, correct errors found in the data, update data in one or more screens, and/or fill in missing information. Eventually, the user may complete the wizard (Step 325). Completing the wizard may correspond to a determination of complete and valid data requested by the wizard. In other words, the user has completed the wizard if the user has provided all data required by the wizard and the data is within certain ranges, is correctly formatted, and/or is consistent as defined by rules governing the data entered into the wizard. If the wizard is not completed, the user may continue to enter and/or update data (Step 307), use thumbnail rollovers (Step 315), change screens (Step 319), and use the live thumbnails to fix errors and fill in missing data.

If the wizard is completed, a summary thumbnail may be displayed to the user (Step 327). The summary thumbnail may include a summary of the data entered by the user. The summary thumbnail may also correspond to a summary screen that contains a more detailed display of the data entered by the user. By viewing the summary thumbnail and/or summary screen, the user may review the data entered before the wizard performs the task using the data. For example, an employer may choose to review payroll data entered into a payroll wizard before the payroll data is used to process payroll for one or more employees of the employer. As described above, the summary thumbnail may not be updated until the wizard has determined that the data entered by the user is complete and accurate. Finally, the data is used to complete one or more tasks for the user (Step 329). The data may also be stored in a repository, such as the employer data repository and/or employee data repository of FIG. 1, for future reference and/or access.

Figure 4:
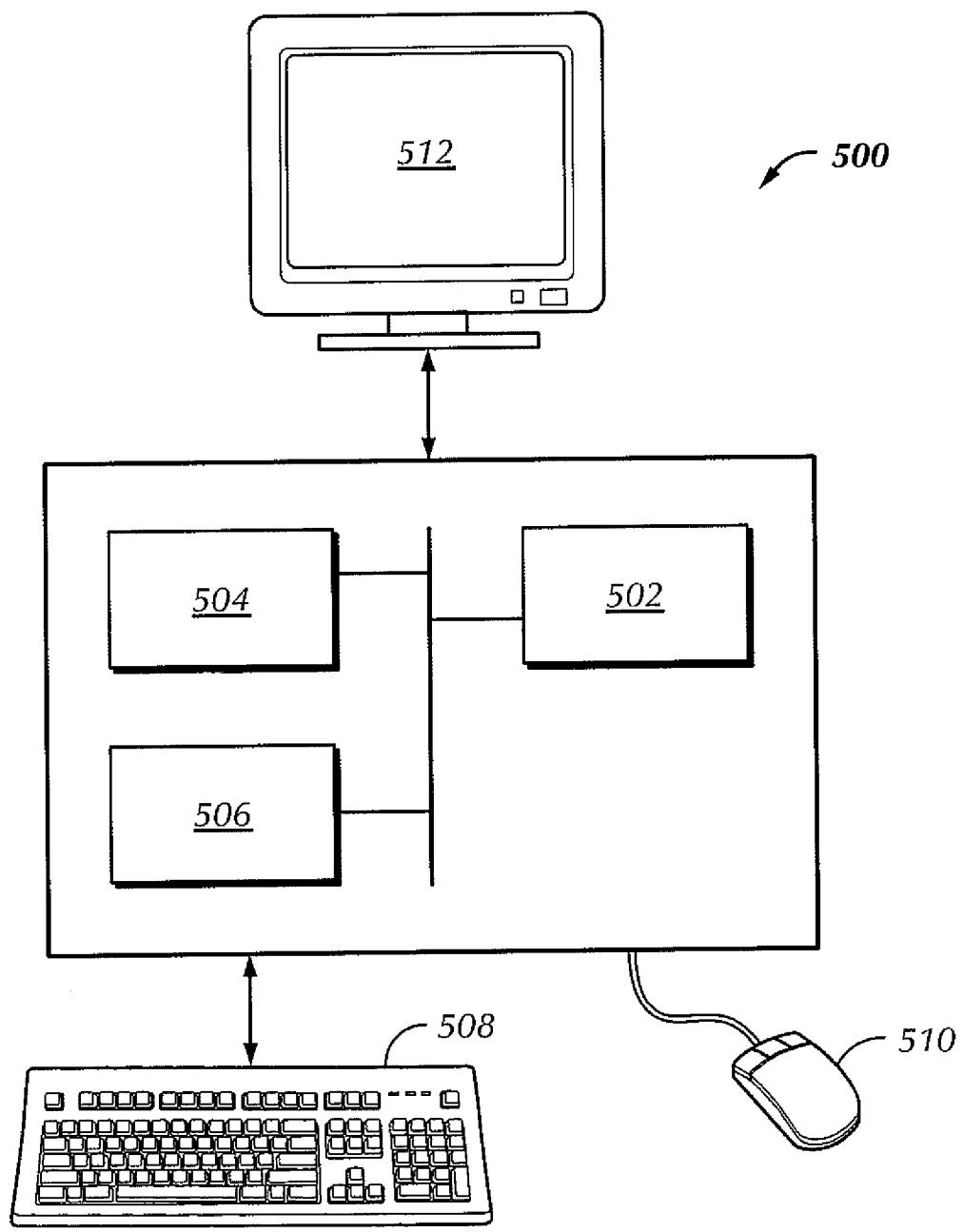
FIG. 4 shows a computer system in accordance with one or more embodiments of the invention.

The invention may be implemented on virtually any type of computer regardless of the platform being used. For example, as shown in FIG. 4, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., payroll system, employer interface, employee interface, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing payroll, comprising:
generating, by a hardware processor, a payroll wizard comprising a plurality of screens corresponding to a sequence of steps required to process payroll;
generating, by the hardware processor, a plurality of live thumbnails comprising miniaturized sections of the plurality of screens corresponding to the sequence of steps required to process payroll;
displaying, using the hardware processor, a first screen of the plurality of screens and the plurality of live thumbnails to a user;
populating, by a hardware processor, a field on the first screen with payroll data entered by the user;
determining, by the hardware processor, a validity of the payroll data;
updating, by the hardware processor and in response to populating the field on the first screen, a first live thumbnail to comprise the payroll data and an indication of the validity of the payroll data;
receiving a selection from the user corresponding to a second screen of the plurality of screens;
displaying the second screen to the user in response to the selection; and
updating a second live thumbnail of the plurality of live thumbnails corresponding to the second screen of the plurality of screens based on the screen selection,
wherein the payroll data is used to process payroll for the user.

2. The method of claim 1, wherein the second live thumbnail of the plurality of live thumbnails is updated to indicate the screen selection of the second screen of the plurality of screens.

3. The method of claim 1, wherein the screen selection is made by clicking on the second live thumbnail of the plurality of live thumbnails.

4. The method of claim 1 wherein the screen selection is non-sequential.

5. The method of claim 1, further comprising:
receiving, prior to receiving the selection from the user corresponding to the second screen, a rollover corresponding to the second live thumbnail of the plurality of live thumbnails; and
displaying a pop-up associated with the second live thumbnail of the plurality of live thumbnails using the payroll wizard.

6. The method of claim 5, wherein the pop-up comprises at least one selected from a group consisting of a screen summary, historical information, payroll information, tax information, human resources information, and error information.

7. The method of claim 1, further comprising:
determining a completeness of the payroll wizard based on the payroll data; and
displaying a summary thumbnail comprising a summary of the input data based on the completeness.

8. A payroll system, comprising:
a hardware processor;
an employer data repository configured to store employer payroll data corresponding to an employer;
an employer payroll wizard executing on the hardware processor and configured to:
obtain the employer payroll data in a first sequence of steps from the employer data repository;
generate a first plurality of screens, wherein each screen of the first plurality of screens corresponds to a step of the first sequence of steps; and
generate a first plurality of live thumbnails comprising miniaturized sections of the first plurality of screens, wherein each of the first plurality of live thumbnails corresponds to a screen of the first plurality of screens corresponding to the first sequence of steps of the employer payroll wizard; and
a rules repository configured to determine a validity of the employer payroll data based on a plurality of payroll rules,
wherein the employer payroll wizard processes a payroll and taxes of the employer, and
wherein at least one of the first plurality of live thumbnails is updated to comprise the employer payroll data and an indication of the validity of the employer payroll data.

9. The payroll system of claim 8, further comprising:
an employee data repository configured to store employee payroll data corresponding to an employee of the employer; and
an employee payroll wizard configured to obtain the employee payroll data in a second sequence of steps, the employee payroll wizard comprising:
a second plurality of screens, wherein each screen of the second plurality of screens corresponds to a step of the second sequence of steps; and
a second plurality of live thumbnails comprising miniaturized sections of the second plurality of screens, wherein each of the second plurality of live thumbnails corresponds to a screen of the second plurality of screens corresponding to the second sequence of steps of the employee payroll wizard,
wherein the rules repository is further configured to determine a validity of the employee payroll data based on the plurality of payroll rules, and
wherein at least one of the second plurality of live thumbnails is updated to comprise the employee payroll data and an indication of the validity of the employee payroll data.

* * * * *